United States Patent [19]

Cairo

[11] Patent Number: 5,566,230
[45] Date of Patent: Oct. 15, 1996

[54] METHOD OF CERTIFYING AN INFORMATION CONTENT OF A TELEPHONIC EXCHANGE

[75] Inventor: Jerry Cairo, Chicago, Ill.

[73] Assignee: Matthew J. Cairo, Plant City, Fla.

[21] Appl. No.: 368,350

[22] Filed: Jan. 4, 1995

[51] Int. Cl.6 .................................................... H04M 11/00
[52] U.S. Cl. ........................... 379/93; 379/100; 358/400; 358/407
[58] Field of Search ...................... 379/100, 93, 96–98, 379/213, 214, 201; 370/61; 358/400, 402, 403, 404, 401, 407, 434–440, 442, 468

[56] References Cited

U.S. PATENT DOCUMENTS

| | | |
|---|---|---|
| 4,524,393 | 6/1985 | Ohzeki . |
| 4,642,697 | 2/1987 | Wada ...................................... 379/100 |
| 4,670,791 | 6/1987 | Murata et al. . |
| 4,748,662 | 5/1988 | Hirata ...................................... 379/100 |
| 5,038,226 | 8/1991 | Nagaishi ................................. 379/100 |
| 5,057,941 | 10/1991 | Moriya . |
| 5,155,601 | 10/1992 | Toyama . |
| 5,274,467 | 12/1993 | Takehiro et al. . |
| 5,283,665 | 2/1994 | Ogata . |
| 5,303,296 | 4/1994 | Zucker . |
| 5,341,413 | 8/1994 | Hori et al. . |
| 5,351,136 | 9/1994 | Wu et al. . |
| 5,357,245 | 10/1994 | Hagiwara . |
| 5,404,231 | 4/1995 | Bloomfield ............................. 358/405 |
| 5,459,584 | 10/1995 | Gordon et al. ......................... 358/400 |

FOREIGN PATENT DOCUMENTS

| | | |
|---|---|---|
| 55-23642 | 2/1980 | Japan . |
| 58-184866 | 10/1983 | Japan .................................... 358/403 |
| 2-44933 | 9/1990 | Japan .................................... 370/61 |

*Primary Examiner*—Wing F. Chan
*Attorney, Agent, or Firm*—Welsh & Katz, Ltd.

[57] ABSTRACT

A method and apparatus is offered of certifying an information content of a telephonic exchange between a calling party and a called party. The method includes the steps of establishing a unidirectional signal path between the calling party and a transcriber and between the called party and the transcriber. The method further includes the step of transcribing the communicated information of calling and called parties along with indicia of source and time of transmission.

8 Claims, 3 Drawing Sheets

METHOD OF CERTIFYING AN INFORMATION CONTENT OF A TELEPHONIC EXCHANGE

FIELD OF THE INVENTION

The field of the invention relates to facsimile machines and in particular to a means of certifying a facsimile transmission.

BACKGROUND

Facsimile (fax) machines and the fax transmissions originating from such machines are known. Such machines are typically used to transfer printed and graphical information over great distances via a public switch telephone network (PSTN).

Within a fax machine the printed or graphical information is typically converted into an electrical signal using an optical scanner. A sheet of paper containing the printed or graphical information is fed into a set of transport devices (e.g. rollers) within the fax machines which transports the sheet of paper past the optical scanner. The scanner rapidly scans the width of the sheet transverse to a direction of movement as the sheet is transported past the scanner. A modem within the fax machines converts the electrical signal from the optical scanner into a variable frequency, electrical signal typically in the audio range, for transmission through the PSTN.

At a fax receiver the variable frequency signal is converted into a variable direct current (DC) voltage which is then used to electostatically dispose a darkening agent (toner) on a received fax sheet in such a manner as to recreate the image detected by the scanner at the transmitting fax machines. The toner is then fixed to the sheet by the application of heat, or otherwise, to complete the process.

To initiate a fax transmission an operator enters a destination telephone number of the fax transmission and loads the material to be faxed into a paper tray on the transmitting fax machine. The transmitting fax then scans the faxed material into a memory in anticipation of transmission. Once the material to be faxed is loaded into memory, the transmitting fax machine seizes an interconnected telephone line and transmits the destination telephone number to a controller within the PSTN. The PSTN controller through a number of local and remote telephone switches, interconnects the calling fax to a target fax. A local PSTN controller notifies the target fax of the incoming call by causing a telephone associated with the target fax machine to ring. The target fax detects the electrical pulses of the ringing, seizes the telephone line and establishes a connection with the transmitting fax machine. The faxed information is then transferred from the transmitting to target fax machine. Upon completion of a transmission, a fax report is printed by the transmitting fax machine listing, inter alia, a target telephone number and number of pages transmitted.

While existing fax machines work well, the prior art has taught that a fax machine can not be relied upon where proof of delivery is required such as for notification of consumer product safety hazards or certain types of court documents. Where proof of delivery is required the prior art has taught that the only alternative is certified U.S. Mail or hand delivery. Because of the importance of certifying delivery of such documents a need exists for a method of certifying fax transmissions.

OBJECTS AND SUMMARY OF THE INVENTION

Accordingly, a primary object of the present invention is to provide a method for using existing telephone apparatus and equipment, but in an arrangement to enable the exchange of electronic certified or registered telephonic transmissions instead of the use of mailing systems for such purposes.

A further and more particular object of this present invention is to provide the steps of a telephone "certified" or "registered" transmission system which enables the telephone number of the originator and recipient of the exchange to be recorded along with the time and date of the call and the contents of the telephonic transmission itself.

A further and more specific object of the present invention is to enable the sending of a hard copy record of the exchange to the initiator of the call.

These and other objects of the present invention are provided in a method and apparatus of the present invention of certifying an information content of a telephonic exchange between a calling party and the called party. The method includes the steps of establishing a unidirectional signal path between the calling party and a transcriber and between the called party and the transcriber and transcribing the communicated information of calling and called party's along with indicia of source and time of transmission.

BRIEF DESCRIPTION OF A PREFERRED EMBODIMENT

The solution to the problem of certifying fax deliveries lies conceptually in interconnecting a fax printer for certification of fax transmissions (certification fax receiver) with a local telephone switch of the PSTN and printing a copy of each page of the fax transmission along with an indicia of delivery. The indicia of delivery may include a telephone number of a destination fax machine, an indication that the faxed sheet was properly delivered, and a time of document delivery.

An originating fax machine may request fax delivery certification by a particular sequence of dialed digits. For example, a controller of a local switch of the PSTN could be programmed to recognize that where a character on a touch tone phone such as a "#" were pressed twice followed by a telephone number of a destination fax machine, that such sequence is to be interpreted as a request for fax delivery certification.

The controller of the local switch upon receiving the request for fax delivery certification would strip off the first two characters (##) and thereafter handle call routing between the originating and destination fax machine as under the prior art. One difference, however, is that the certification fax receiver would be added to the call connection under a technique similar to three-party calling.

The indicia of delivery of a fax transmission is information readily available to the controller of the local switch. The telephone number of the destination fax machine is received by the local switch controller during call set-up and is retained in memory of the local switch controller. Time and date are also available within the local switch controller as part of call billing facilities. The acknowledgement of receipt of a page of a fax transmission, on the other hand, is something that the local switch controller obtains by monitoring the fax transmission.

During a fax transmission, the originating fax transmits information one line at a time until an end of page is encountered at which time the receiving fax machine acknowledges receipt of the page, or the originating fax re-transmits the page. Under an embodiment of the invention, the local switch controller monitors the fax transmission for page receipt acknowledgements. Upon receipt of a page acknowledgement the certification fax receiver prints the indicia of delivery on a locally printed reproduction of the fax page thereby certifying delivery of the fax page.

Figure 1:
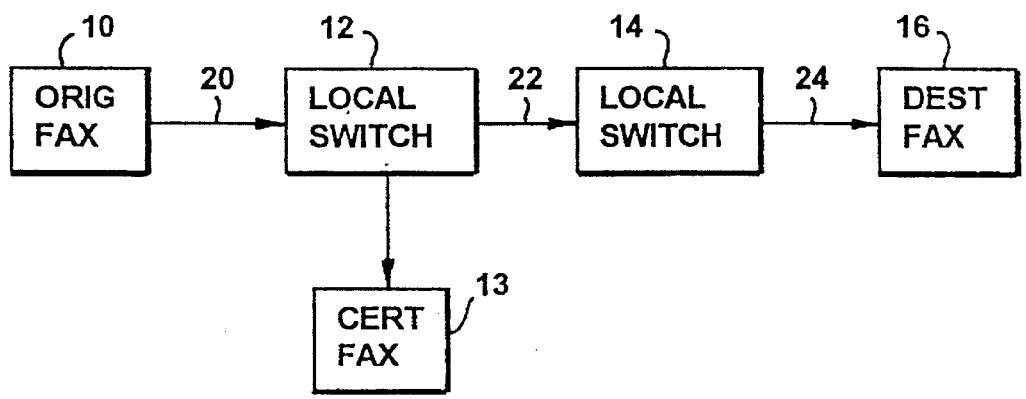
FIG. 1 is a block diagram showing transmitting and receiving facsimile machines interconnected through a telephone network having facsimile certification apparatus in accordance with an embodiment of this invention.

FIG. 1 is a block diagram of a PSTN system showing the fax certification feature in accordance with an embodiment of the invention. As shown, an originating fax 10 is provided with a telephone interconnect 20 between the originating fax 10 and a local switch 12 of the PSTN. A destination fax 16 may be interconnected directly to the same local switch 12 as the originating fax 10 or be interconnected through a second local switch 14 as shown in FIG. 1.

It is to be understood that local switches 12, 14 of a PSTN each have a number of telephone interconnects 20, 24 depending on the size of the local switch 12, 14 and the number of local subscribers 10, 16 in the geographic area of each local switch 12, 14. It is also to be understood that local switches 12, 14 of a PSTN are interconnected through a number of trunk groups were the trunk groups provide a means of exchanging communicated information between a first local switch and other local switches in other geographic areas. FIG. 1, in specific, shows a first local switch 12 in a first geographic area interconnected with a second local switch 14 in a second geographic area through a particular trunk group 22.

Each trunk group 22 is made up of a number of communication channels that, within an integrated services digital network (ISDN), may range from a basic rate interface (BRI) (with very few channels and fairly low capacity) to the larger T1 lines with capacities in excess of one Megabits per second. If local switches 12, 14 were of a fairly low capacity, then the interconnecting trunk group 22 may be made up of one or more BRIs where each BRI consists of 2-B channels (typically used for the exchange of subscriber traffic information at a rate of 64 kilo bits per second per channel) and 1-D channel (used for the exchange of control information between switches at a rate of 15 kilo bits).

Figure 2:
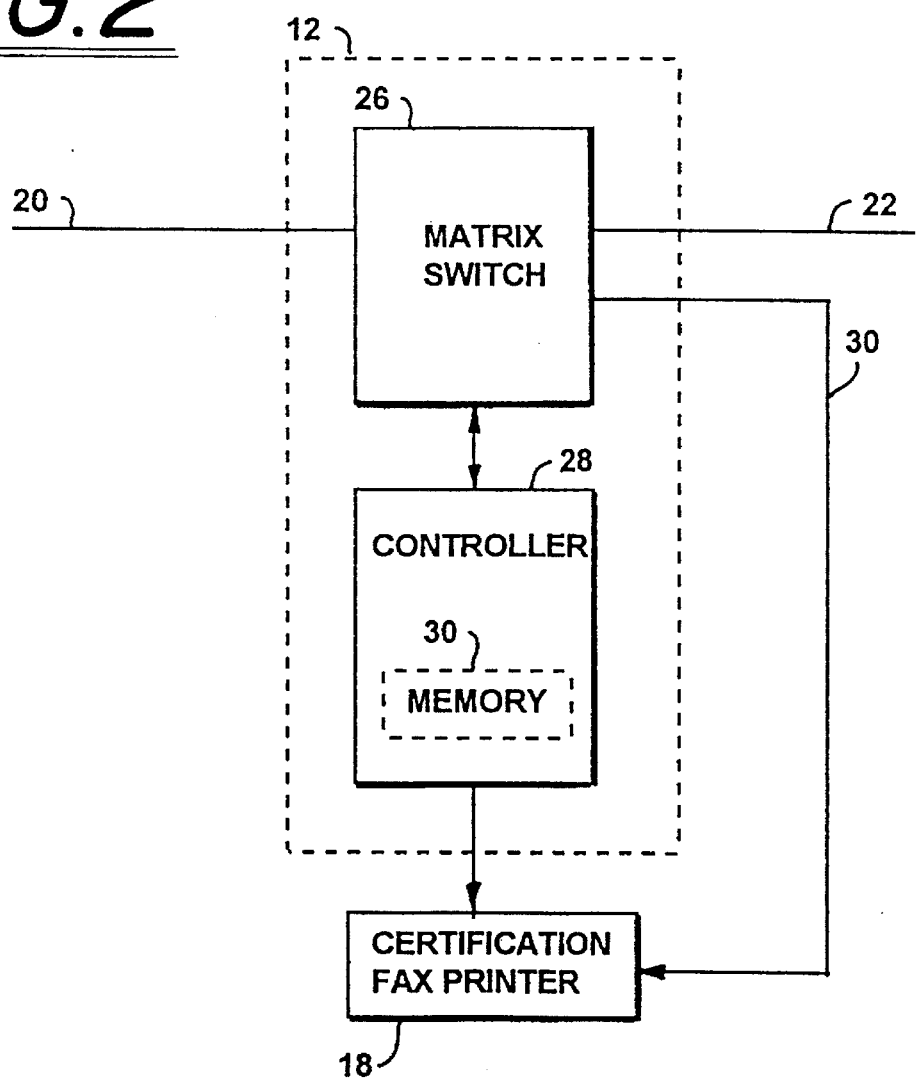
FIG. 2 is a block diagram of a local telephone switch and interconnected facsimile certification apparatus in accordance with an embodiment of this invention.

FIG. 2 is a block diagram of the local switch 12 and fax certification printer 18 of FIG. 1. As shown, the local switch 12 has a matrix switch 26 and local switch controller 28. During normal operation of the PSTN the local switch controller 28 periodically monitors local telephone interconnect 20 for call requests. Upon receipt of a call request, the controller 28 by reference to a called number received from the originating fax machine 10 on a telephone interconnect 20 determines by reference to a memory 30 that the target of the call request (destination fax 16) may be accessed through a particular trunk group 22 and local switch 14. To establish a connection between the originating fax machine 10 and destination fax machine 16 the local switch 12 of the originating fax machine 10 (requesting switch 12) seizes a D channel of the trunk group 22 and transmits an access request to the local switch 14 of the destination fax machine 16 (destination switch 14). If the destination fax 16 is not occupied by a prior call (telephone interconnect 24 busy) and a subscriber traffic channel (B channel) between the requesting switch 12 and destination switch 14 is available, then the destination switch 14 responds by transmitting an access grant back to the requesting switch 12 identifying an allocated traffic channel to be used during the fax transmission. The destination switch 14 also signals the destination fax 16 of the incoming call. When the destination fax 16 answers the call, switch 14 connects telephone interconnect 24 with the identified traffic channel of the trunk group 22.

The controller 28 of the requesting switch 12, in response to the access grant and to the destination fax answering the call, directs the matrix switch 26 to provide an connection between the allocated traffic channel of the trunk group 22 and the telephone interconnect 20 of the originating fax 10.

Immediately after answering the call, the destination fax 16 begins transmitting a connect tone. When the end-to-end connection of the duplex channel between the originating fax 10 and destination fax 16 is completed, the originating fax 10 answers the connect tone and a negotiation of fax transmission protocol and transmission baud rate follows. Following completion of set-up of originating fax 10 and destination fax 16, the transmission of the fax message may begin.

Where the call request received from the originating fax 10 contains a request for fax certification, the controller 28 of the requesting switch 12 also instructs the matrix switch 26 to provide a three-party connection among the telephone interconnect 20 of the originating fax 10, the allocated traffic channel of the trunk group 22 and the interconnect 30 of the certification fax 18. During fax set-up the certification fax 18 by monitoring the exchange between the originating fax 10 and destination fax 16 is set up substantially the same as the destination fax 16.

Interconnect 30, under the invention, is in the nature of a simplex connection allowing one-way transmission of fax data to the certification fax. The certification fax is not allowed to request a re-transmission of lost data from the originating fax 10.

Since the certification fax does not participate in the negotiation of fax protocol or speed and since the certification fax must accommodate the capabilities of originating and destination fax machines, the certification fax may be of a somewhat greater level of sophistication than the originating or destination fax machines. In all other regards, the certification fax may be selected from any of a range of commercially available fax machines.

Under an embodiment of the invention, provisions are made to avoid printing the indicia of delivery on top of the contents of each page of the fax transmission. Under such an embodiment an oversize paper tray (e.g., for 17 inch by 23 inch paper) is used to supply the certification fax. The oversize supply sheet is queued in a normal manner with the information of each page of the fax transmission printed at the top of the oversized sheet within the certification fax machine. At the output end of the certification fax machine an appropriate printer (e.g. a laser printer) is provided for printing the indicia of delivery on the bottom of each oversized sheet. Together, the certification fax machine and certification printer comprise a certification fax printer 18 providing a degree of reliability of delivery of fax transmissions not available from other sources.

The certification printer is programmed in a known manner to print the indicia of delivery in a non-interfering location of the printed document certifying fax delivery. The indicia of delivery are transferred to the certification printer from the local switch controller 28 via an appropriate data interface (e.g., RS232 or a LAN). The controller 28 may provide the indicia of delivery such as the telephone number of the destination fax 16 based upon the destination telephone number included in the original access request, or may query the destination switch 14 over an appropriate D channel of the trunk group 22 after each page of the fax transmission to determine where that page of the fax transmission was sent for purposes of providing additional certainty in the verification process.

Following completion of the documents certifying the delivery of a fax transmission, copies of the document may be sent via regular mail to the originating fax operator, with the original documents held in secure storage. Holding the original documents in an area of secure storage allows for a greater reliability against alteration. Such a method also allows for a fax certification system operator to later offer testimony in a court of law, or otherwise, as to the methods used in certification and to the reliability of such services.

In another embodiment of the invention, the certification fax machine and certification printer are combined into one device. Under such an embodiment a page of fax material is compressed in size to occupy ¾ of a standard size fax page with indicia of delivery occupying the remaining ¼ of the fax. Data delivery to the certification fax under the embodiment is accomplished through use of a data buffer in series with the interconnect 30 and with a data switch interposed between the buffer and certification fax under the control of the controller 28. During transmission of a page of fax information the controller 28 instructs the data switch to pass fax information from the buffer to the certification fax. When the controller 28 detects an end-of-page message from the originating fax 10 and a page acknowledge message from the destination fax 16, the controller 28 instructs the data switch to interrupt the transfer of data from the buffer to the certification fax and, instead, pass indicia of delivery from an output of the controller 26 while the buffer accumulates any new data from succeeding fax pages. Once the data switch transfers the indicia of delivery from the controller 28 to the certification fax followed by a locally generated end-of-page, which indicia is printed on the bottom quarter of the fax page, the controller 28 again instructs the data switch to pass data from the buffer.

In another embodiment of the invention, the fax transmission is not printed immediately with indicia of delivery associated with each page but, rather, the entire fax transmission is stored as a common file with indicia associated with the entire file stored in conjunction with the file as a composite file. As with above embodiments, the composite file is stored in a secure facility with a single summary page printed after creation of the composite file and sent to the operator of the originating fax machine for record keeping purposes. Should a need arise for proof of delivery, the entire composite file is printed upon demand.

In another embodiment, the invention is extended to electronic mail (E-mail) systems operating upon PSTN. Under the embodiment the controller 28 of the switch 12 detects the request for such transmission through identifying digits using in conjunction with a target address. An E-mail printer associated with the switch 12 monitors the transmission through a three-party connection. As above, indicia of delivery are printed on a copy of the E-mail message (preferably in a different color).

Under another embodiment of the invention, a composite file is generated and stored within the originating fax machine as a read-only file using well-known programming techniques. The read-only file is generated using a randomly generated access code known only to the originating fax machine and which machine allows for printing of the composite file with indicia on each page or in summary form or, alternatively, allows for deletion of the entire file under operator control.

In another embodiment of the invention, certification of delivery is extended to information exchanged between two parties communicating between an originating telephone and a destination telephone (calling and called party) under a multitude of formats (e.g., spoken words, dual tone multi-frequency (DTMF), amplitude modulation (AM), frequency modulation (FM), etc.). Since a telephone voice channel is typically constructed to exchange signals in the audio range (i.e., 0–20 kHz) an audio recorder may be used to record exchanged information along with indicia of delivery. The recorded information may later be converted and transcribed to a visually readable form along with the indicia of delivery.

Alternatively, the exchange information may be decoded on-line using decoding devices that are well known in the art. Where the information is exchanged verbally, a voice recognition unit may be used to drive a printer to provide a certified hard copy along with time and date of the information exchange. Where the information is exchanged under a frequency modulated format, a modem may be used. In general, a controller of a certified hard copy delivery system recognizes the format of the information exchange and allocates the resources to convert the exchanged information into a form (e.g., RS232) recognizable by a printer.

Figure 3:
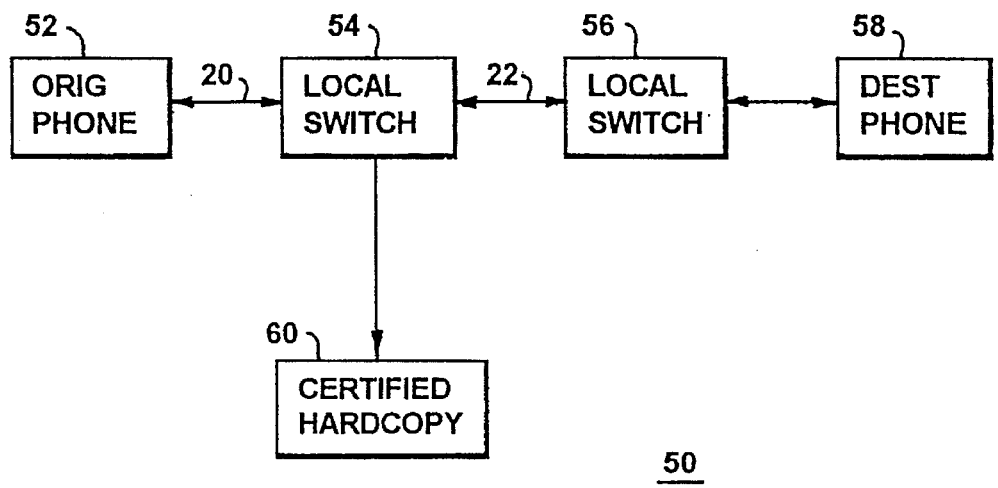
FIG. 3 is a block diagram of an alternate embodiment under the invention.
Figure 4:
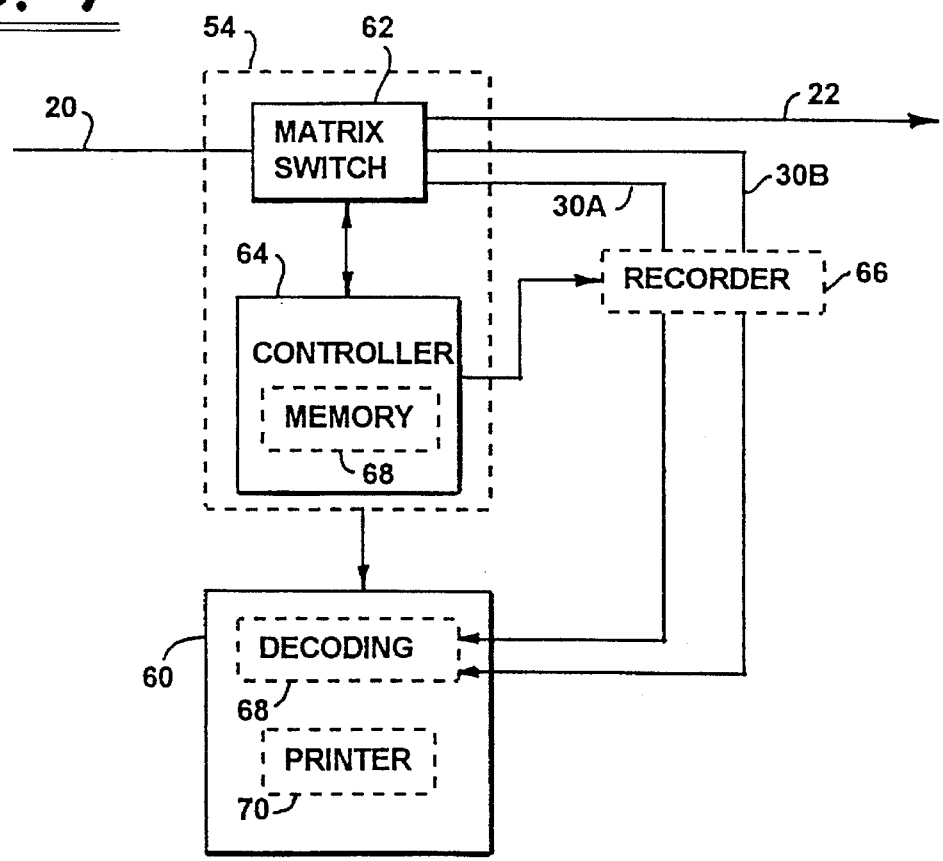
FIG. 4 is a block diagram of the local switch and certified hard copy printer of FIG. 3.
Figure 5:
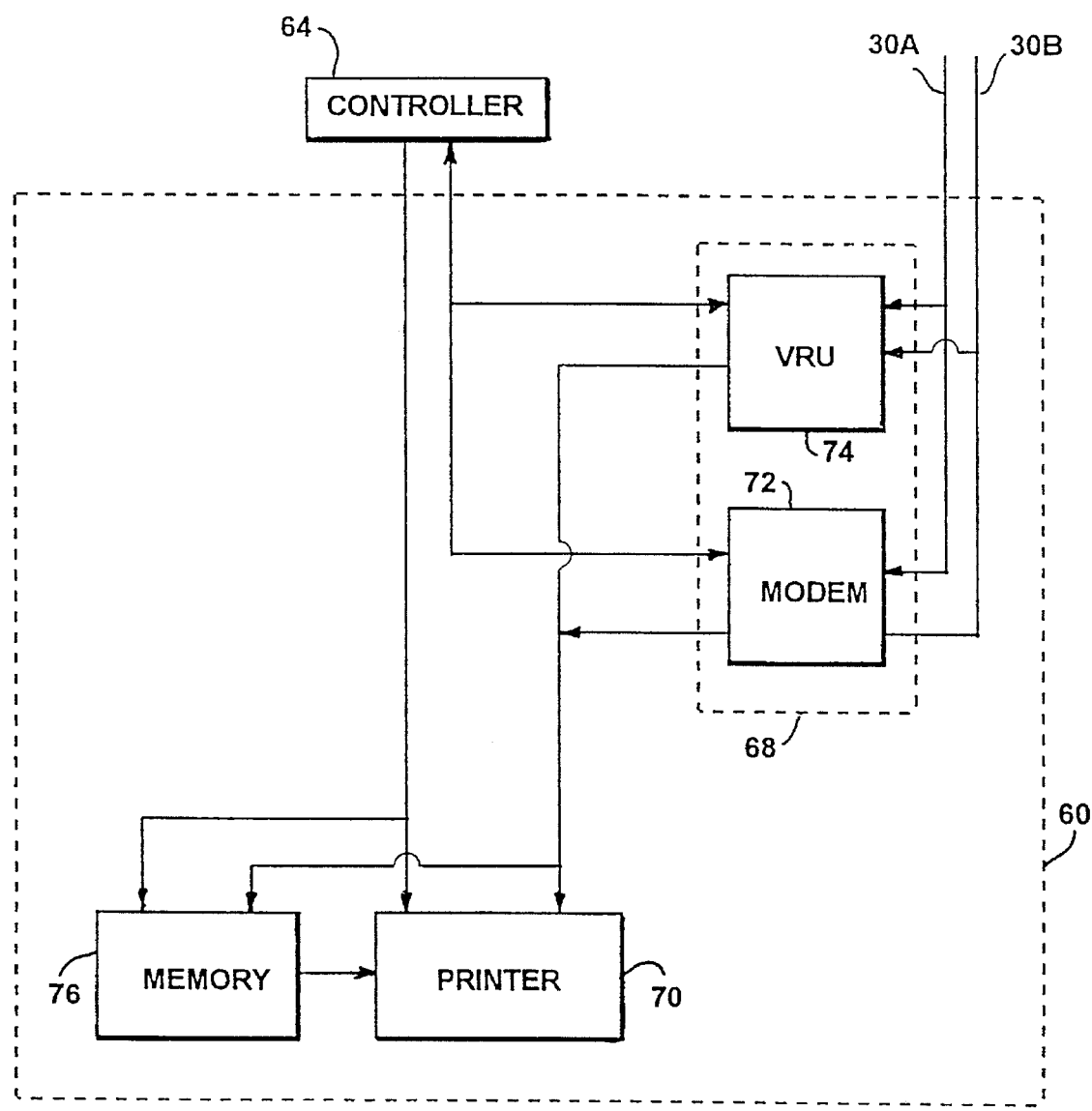
FIG. 5 is a block diagram of the controller and controller and certified hard copy printer of FIG. 4.

FIG. 3 is a block diagram of the certified information exchange system 50 in accordance with the invention. As with previously described systems (i.e., FIG. 1) an originating telephone 52 requests information exchange certification by use of a particular sequence of dialed digits. A controller 64 (FIG. 4) by reference to memory 68 recognizes the sequence as a request for certification, strips off the certification request digits, and forwards the re-formatted call request to a local switch 56 of the destination phone 58 for call set-up. The controller 64 also instructs the matrix switch 62 to establish a connection 30a, 30b between the certified hard copy delivery system 60 and the duplex voice channel 20,22.

To eliminate confusion as to the source of certified information, the duplex voice connection on voice paths 20 and 22 is divided into a first unidirectional (simplex) voice path 30a (i.e., from originating phone (calling party)) 52 to destination phone (called party) 58 and a second unidirectional (simplex) voice path 30b (i.e., from destination phone 58 to originating phone 52). Dividing the duplex voice connection 20,22 as to source allows the source of the information presented on the certified hard copy printout to be precisely identified.

Where an optional recorder 66 is used, the information on the first and second unidirectional voice paths are stored on a first and second recording channels with indicia of delivery (e.g., time, originating and destination telephone numbers)

stored on a third recording channel. The indicia of delivery can be stored on the third recording channel under a voice format with the voice signal Originating from a voice synthesizer (not shown), within the controller 64. Alternatively, the certification hard copy printing system 60 certifying an information content of a telephonic exchange could be a secretary listening to the channels and reducing the recorded information to a certified hard copy.

Where the optional recorder 66 is not used (or is simply used as a device for delaying, some inputs to the certification hard copy delivery during periods of heavy use), the delivery of the certified hard copy may be provided through automated processes. Under the embodiment, decoding units such as a voice recognition unit (VRU) 74 and modem 72 continuously sample the first and second voice paths 30*a*, 30*b* of the duplex voice path 20,22 for communicated information. The controller 64, in turn, analyzes output buffers (not shown) of the VRU 74 and modem 72 for intelligible information (i.e., information that the VRU 74 or modem 72 are able to decode). Where the controller 64 detects intelligible information, the controller transfers such information either directly to the printer along with indicia of source (i.e., source phone or destination phone) or to memory 76 for printout at a later time.

Under the invention, a certified printout of a communicated exchange begins with a page header listing originating and destination telephone numbers and date and time of day. Transmissions (whether covering a portion of a page or many pages) are always prefaced with a source identifier (i.e., originating or destination telephone) and the time the transmission began. Pages are numbered with a non-repeatable sequence number.

Specific embodiments of a novel system for certification of an information control of a telephonic exchange have been described for the purposes of illustrating the manner in which the invention may be used and made. It should be understood that the implementation of other variations and modifications of the invention in its various aspects will be apparent to those skilled in the art, and that the invention is not limited to the specific embodiments described. It is therefore contemplated to cover by the present invention any and all modifications, variations, or equivalents that fall within the true spirit and scope of the basic underlying principles disclosed and claimed herein.

What is claimed is:

1. A method of certifying an information content of each transmission of a telephonic exchange between a calling party and a called party, such method comprising the steps of: locating a transcriber in a secure facility remote from both calling and called party; establishing simultaneous unidirectional signal paths between the calling party and the transcriber and the called party and the transcriber at a local switch; and transcribing the communicated information of each transmission of calling and called party along with indicia of source and time of transmission.

2. The method of claim 1 further comprising the step of transcribing a three-party connection among the calling and called party and the transcriber on each signal path.

3. The method of claim 1 wherein the step of transcribing further comprising the step of decoding the communicated information.

4. The method as in claim 3 further comprising the step of printing the decoded information.

5. The method as in claim 1 further comprising the step of detecting a request for certifying a communicated information content of a telephonic exchange.

6. The method of claim 1 further comprising the step of setting up a call connection between calling and called party.

7. Apparatus for certifying an information content of a telephonic exchange between a calling party and a called party comprising: means for requesting call certification from one of the calling or called party; means for establishing a unidirectional signal path between the called party and a certifying facility and between the called party and a certifying facility at a local switch; means for providing indicia of identity of the originator of each transmission of the telephonic exchange to the secure facility; and means located within the secure facility for printing the information content of each transmission of the telephonic exchange along with the indicia of identity of the originator of the transmission.

8. The apparatus as in claim 7 further comprising means for printing a time and date of each transmission of the telephonic exchange.

\* \* \* \* \*

UNITED STATES PATENT AND TRADEMARK OFFICE
CERTIFICATE OF CORRECTION

PATENT NO. : 5,566,230
DATED : October 15, 1996
INVENTOR(S) : Jerry Cairo

It is certified that error appears in the above-indentified patent and that said Letters Patent is hereby corrected as shown below:

Column 3, line 42, "were" should read --where--.

Column 4, line 24, "an" should read --a--.

Column 7, line 10, the comma following "delaying" should be omitted.

Column 8, line 15, "transcribing" should read --creating--.

Signed and Sealed this

Twentieth Day of October, 1998

Attest:

BRUCE LEHMAN

Attesting Officer

Commissioner of Patents and Trademarks